(No Model.) 2 Sheets—Sheet 1.
P. B. ABRELL.
MACHINE FOR MAKING PILLS.
No. 429,803. Patented June 10, 1890.
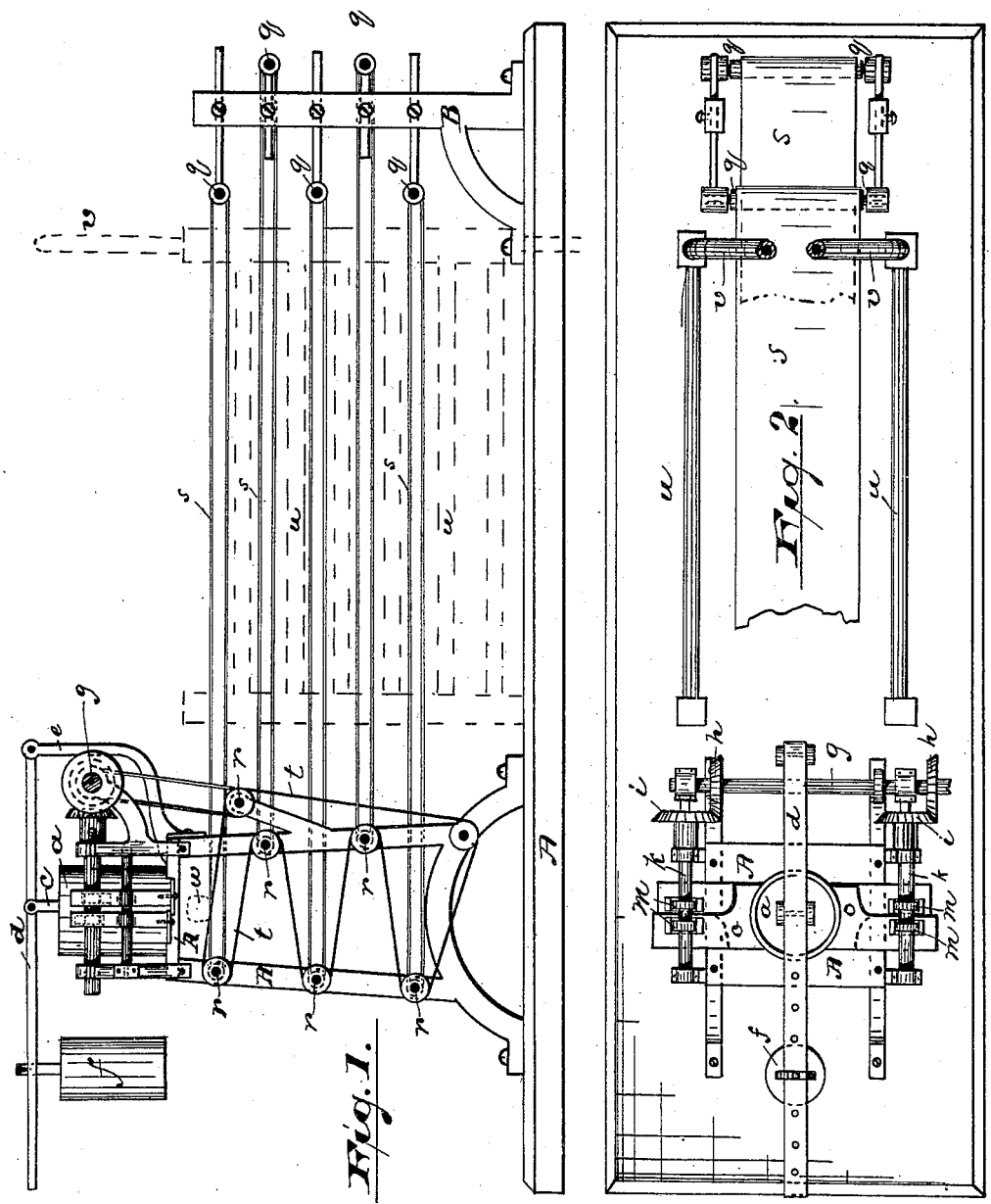
WITNESSES: INVENTOR=
Paul B. Abrell,
BY Drake & Co. ATTY'S.

(No Model.) 2 Sheets—Sheet 2.
P. B. ABRELL.
MACHINE FOR MAKING PILLS.
No. 429,803. Patented June 10, 1890.
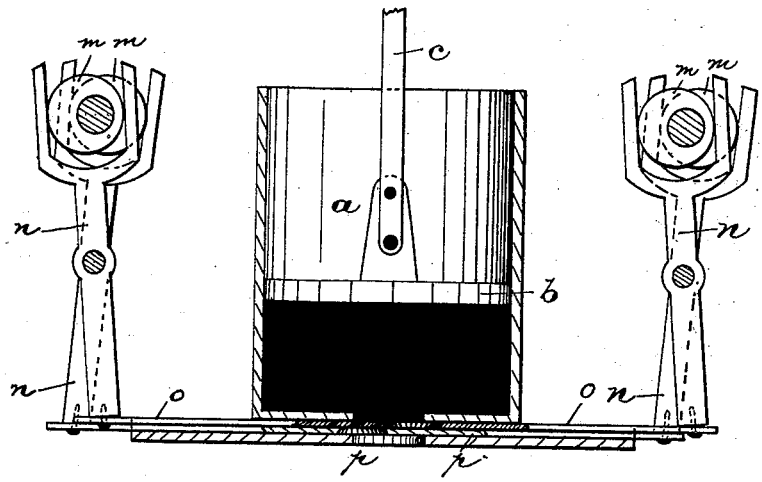
Fig. 3.
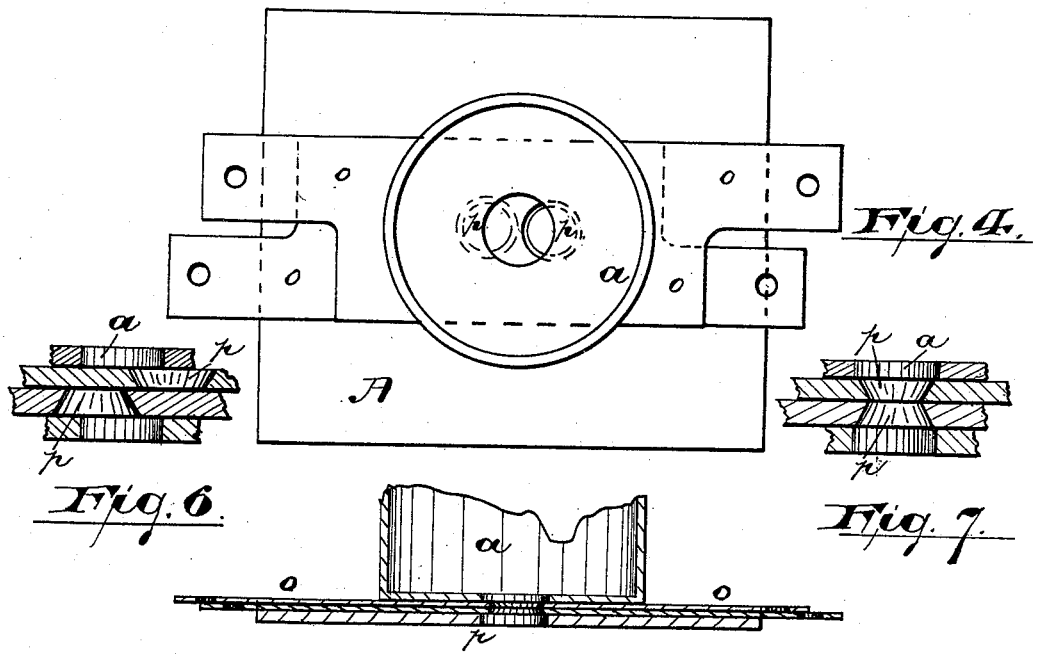
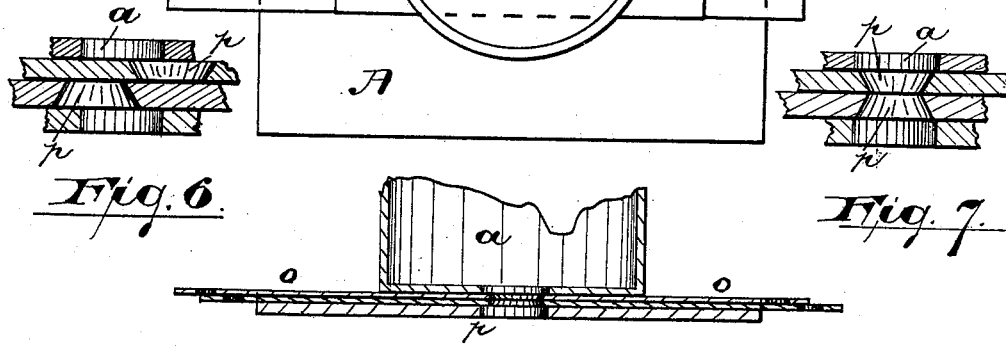
Fig. 4.
Fig. 6.
Fig. 7.
Fig. 5.
WITNESSES: Alfred Gartner, E. L. Sherman
INVENTOR: Paul B. Abrell,
BY Drake & Co., ATTY'S.

UNITED STATES PATENT OFFICE.

PAUL B. ABRELL, OF NEWARK, NEW JERSEY.

MACHINE FOR MAKING PILLS.

SPECIFICATION forming part of Letters Patent No. 429,803, dated June 10, 1890.

Application filed August 2, 1889. Serial No. 319,511. (No Model.)

*To all whom it may concern:*

Be it known that I, PAUL B. ABRELL, a citizen of the United States, residing at Newark, in the county of Essex and State of New Jersey, have invented certain new and useful Improvements in Machines for Making Pills; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to simplify the manufacture of pills and decrease the cost of production.

The invention consists in the improved machine herein shown and described, and the combination and arrangement of parts thereof, substantially as hereinafter set forth, and finally embodied in the claims.

Referring to the accompanying drawings, in which like letters of reference indicate corresponding parts in each of the several figures, Figure 1 is a side view of my improved pill-machine, the heater-pipes being shown in dotted lines. Fig. 2 is a top view, the feeding-aprons being broken away, and also the cross-connection of the heater-pipes. Fig. 3 is a sectional view through the hopper and the cutting-knives, the latter being shown in a closed position. Fig. 4 is a plan view of a portion of the devices shown in Fig. 3. Fig. 5 is a corresponding view to Fig. 3, showing the cutters in open position. Figs. 6 and 7 are enlarged detail views in section, showing the cutters in the two different positions.

In said drawings, $a$ represents a mixer or hopper in which the material is placed. Within the mixer or hopper is adjusted a piston $b$, with rod $c$ connecting said piston with a lever $d$, pivoted to an arm $e$, secured to the frame A of the machine. On the outer end of the lever $d$ is arranged a sliding weight $f$ for keeping the piston continually in contact with the material in the hopper. In the rear of the hopper is arranged a driving-shaft $g$, arranged to run in bearings on the frame. On each end of this driving-shaft are secured beveled gear-wheels $h\ h$, meshing with beveled gear-wheels $i\ i$ on shafts $k\ k$, arranged at right angles to shaft $g$. On these shafts $k\ k$ are secured eccentrics $m\ m$, arranged to operate on the forks of vertical levers $n\ n$, as shown in Fig. 3. To the bottom of these levers $n\ n$ are secured the ends of horizontal cutter-plates $o\ o$, which are arranged together face to face, as shown in Figs. 3, 4, and 5. At the centers of said cutter-plates are formed circular openings or perforations $p\ p$ of a size corresponding to that of the desired pill. These are arranged adjacent to a hole in the bottom of the mixer or hopper $a$ and a similar one in the plate A, so that the four holes will be in line when the said cutter-plates are at the center of their respective motions. The cutter-plates $o\ o$ at said perforations are sharpened or given a cutting-edge of more or less sharpness, as shown in Figs. 6 and 7. The cutters are so constructed that the upper cutter shall have a beveled edge in one direction, the incline being downward and toward the center, while the lower cutter shall have a beveled edge with incline upward in the opposite direction, as shown in Figs. 6 and 7. By this construction the combined operation of the two cutters cuts the piece as it comes from the hopper to the size of the pill as regulated by the cutters.

At the rear of the machine is a standard B, on which are arranged revolving shafts $q\ q$. On the front of the machine are also arranged corresponding shafts $r\ r$. Over and around these shafts are extended a series of endless aprons $s\ s$, one above the other. These aprons receive continuous motion by means of a belt $t$, connected with the driving-shaft $g$ and arranged to pass over and around shafts $r\ r$, as shown in Fig. 1.

In order to gradually dry the pill while being formed, I have arranged heating-pipes $u\ u$ above and below said endless aprons and connected together by an arch $v$.

The operation of my machine will be readily understood from the foregoing description, taken in connection with the accompanying drawings, and, briefly stated, is as follows: The material from which the pellets or pills are made is placed in the hopper and the piston normally presses thereon, forcing the material through the opening of the hopper, where it is cut by the knives into pellets, substantially as shown in dotted lines at $w$, and falls upon the belt, travels over the same, and is dried by the heating-pipes in its course over the belt.

What I claim as my invention, and wish to secure by Letters Patent, is—

1. In a pill-machine, the combination of a hopper having a discharge-opening, a piston or plunger therein, reciprocating cutter-plates working under the discharge-opening of the hopper, and mechanism for operating the cutter-plates, a traveling-belt on which the pellets fall, and a drier.

2. In a pill-machine, the combination, with a feed-hopper and means for feeding the material from said hopper, a pair of cutter-plates for cutting the material fed from the hopper into pellets, levers and eccentrics for operating the cutter-plates, a belt to receive the pellets, and a drier for drying them.

3. In a pill-machine, the combination of a feed-hopper, a piston or plunger therein, a weight for automatically operating the plunger, a pair of cutter-blades having circular perforations adapted to move from and into coincidence with each other, and mechanism for operating the cutter-plates, a belt and mechanism for operating it, and a drier, all substantially as described.

In testimony that I claim the foregoing I have hereunto set my hand this 22d day of July, 1889.

PAUL B. ABRELL.

Witnesses:
  OLIVER DRAKE,
  E. L. SHERMAN.